United States Patent [19]

Goehner et al.

[11] Patent Number: 4,678,144

[45] Date of Patent: Jul. 7, 1987

[54] ELECTRO-IMPULSE DE-ICING SYSTEM FOR AIRCRAFT

[75] Inventors: Robert D. Goehner, Norwich; Norman I. Glover, Guilford; Donald G. Hensley, Norwich, all of N.Y.

[73] Assignee: Simmonds Precision, Tarrytown, N.Y.

[21] Appl. No.: 665,056

[22] Filed: Oct. 26, 1984

[51] Int. Cl.⁴ .............................................. B64D 15/16
[52] U.S. Cl. ............................ 244/134 R; 244/134 D
[58] Field of Search ........... 244/134 R, 134 A, 134 D

[56] References Cited

U.S. PATENT DOCUMENTS

| | | | |
|---|---|---|---|
| 2,135,119 | 11/1938 | Wood | 244/134 A |
| 2,271,466 | 1/1942 | Schmidt et al. | 244/134 A |
| 2,568,669 | 9/1951 | Totherah | 244/134 A |
| 3,549,964 | 12/1970 | Levin et al. | 244/134 A |
| 4,501,398 | 2/1985 | Sandorff | 244/134 R |

FOREIGN PATENT DOCUMENTS

| | | | |
|---|---|---|---|
| 117437 | 9/1943 | Australia | 244/134 A |
| 505433 | 5/1939 | United Kingdom | 244/134 |

*Primary Examiner*—Galen Barefoot
*Attorney, Agent, or Firm*—Harry Williams

[57] ABSTRACT

What is proposed is an electro-impulse de-icing device for use in an airfoil of an aircraft that includes a system having an energy storage device connected via a triggering device to a set of coils each embodying a coil construction in the form of a spirally wound ribbon coil member whose planar dimension is pressed against an interior surface in the leading edge of the airfoil, and wherein the coil sets are arranged in a linear manner along the long axis of the airfoil and are energized simultaneously and sequentially via an interlocking pattern from the wing tips or from the fuselage of the aircraft with each coil set being triggered twice from about three to five seconds apart.

7 Claims, 7 Drawing Figures

ELECTRO-IMPULSE DE-ICING SYSTEM FOR AIRCRAFT

BACKGROUND OF THE INVENTION

This invention relates to de-icing systems for use with aircraft, particularly those systems employing electromagnetic impulse technology for deforming the airfoil skin of the leading edge or nose portion of the wing and fin members of an aircraft. It is well known that deformation of the airfoil skin can fracture the ice formed thereon during flight and so aid in the ice's break-up and removal from the wing or fin member. This particular kind of technology is to be contrasted with other and earlier stratagies used for similar purposes, such as the Bleed Air type which uses air from the engine to heat the aircraft structure, requiring therefore special ducting systems and extra engine power to deliver the heat, the Thermal type which requires substantial amounts of power for heat, and the Weeping Wing which comprises thousands of tiny holes drilled in the wings through which a chemical bleeds to wet the wings' surfaces with a glycol solution or the like.

In the case of electromagnetic systems, however, British Pat. No. 505,433 provides a basic teaching of employing electromagnetic impulses as a source of wave or mechanical deformation in the skin of an airfoil, as well as generally positioning the force producing electromagnetic coils in the vicinity of the leading edge of the airfoil and, further, sequentially energizing an array of such coils along the long axis of the airfoil. Further examples of energy or pulse producing and distribution systems may be had from the various patents owned by Levin et al, particularly U.S. Pat. No. 3,779,488 which shows more advanced technology, namely, program switching devices for energizing the various coils arranged in the airfoil.

More recently, U.S. Pat. No. 4,399,967 directs its attention to a particular configuration of coil arrangements which employ the prior art concepts above described. More particular, this patent teaches a staggered array of impact coils spanwise of an airfoil so that when the coils are energized a torsional wave deformation occurs in the skin of the airfoil.

With respect to the prior art systems and electromagnetic systems generally, performance is limited by a number of factors including the stress produced in the airfoil, the magnitude of deformation for a given size coil, the weight and physical distribution of such systems throughout the aircraft, the individual coil configuration and support within the airfoil itself, and the nature of the array of the coils within the entire airfoil.

SUMMARY OF THE INVENTION

It is a principle object of the present invention to address those factors abovementioned and therefore provide an electro-impulse de-icing system which improves upon existing systems by employing a simple and efficient design for the inductive coil construction and support, such as to remove ice from an airfoil or wing member in a timely and safe manner. The present invention derives none of the faults associated with previously used systems, that is, gross deformations in the airfoil itself, or uneven and ineffective stress resulting from complicated arrays of coil positions within the airfoil, or complex circuitry which contributes to excessive weight and size.

The present invention has for its ancillary objects and benefits the provision of a simple and efficient control circuit for operating the de-icing system according to the invention for the removal of ice from all the airfoil members of the aircraft in a matter of three to five minutes. By means of the invention the array of impulse coils within the airfoil, that is, each of the airfoils of the aircraft, can be implemented in a straightforward linear manner without recourse to prespecified patterns requiring additional engineering design.

The de-icing system according to the invention comprises three electrical assemblies: an energy storage unit, a coil assembly, and a trigger unit. In a typical General Aviation type of aircraft the invention would be realized by one storage unit, eleven trigger units, and twenty-two to thirty-three coil assemblies. The energy unit is installed in the fuselage, while the coil assemblies and trigger units are installed where it is desired to shed ice, such as the leading edge of the wing, empennage and/or stabilizer. The energy storage unit is the heart and brains of the system and accepts power from the aircraft bus, steps up the voltage, rectifies it and stores energy in capacitors. The logic circuitry in the energy storage unit will direct the stored energy to the designated set of coils and trigger unit upon command. This unit also has the necessary EMI (electromagnetic interference filters) to prevent electrical noise from flowing back into the aircraft electrical system. The coil assemblies are coils of copper ribbon wound in a tight spiral forming a flat coil approximately three to four inches in diameter. Two or three of these coils form a set, and one trigger unit is connected to each set, the trigger unit comprising an assembly of SCRs connected between the energy storage unit and the coil assemblies.

In operation the energy unit builds up the voltage and stores it in the capacitors until they have the correct amount of energy, then the logic circuit selects a coil set to be energized and directs a signal to the trigger unit controlling that set of coils. The SCRs complete the electrical circuit of the system when they are turned on. Thus current flowing through the coil or coil set generates an electromagnetic pulse in the surrounding area and causes the metal surface to be repelled (deflected), giving rise to a wave to be propagated in the metal surface. When the metal surface is deflected by the pulse it fractures the ice and thus weakens the ice's bond to the metal surface. A second pulse is given to the same set of coils about three to five seconds after the first pulse which thus propels the ice in very small fragments into the airstream. The system according to the invention will shed ice having thicknesses up to several inches; in fact it has been found that if the ice is allowed to build up the system according to the invention operates more efficiently. While it has been found by those practicing the invention that a sequential operation of the coil sets operates reasonably well, the principles of the invention afford a much more efficient method of operation in which the coil sets are progressively energized in pairs which dove-tail with one another, and the coil sets of each pair are simultaneously energized in the course of progressively energizing the pairs of coil sets positioned along the airfoil.

The invention will be better understood as well as further objects and advantages thereof become more apparent from the ensuing detailed description taken in conjunction with the drawings.

DETAILED DESCRIPTION

Figure 1:
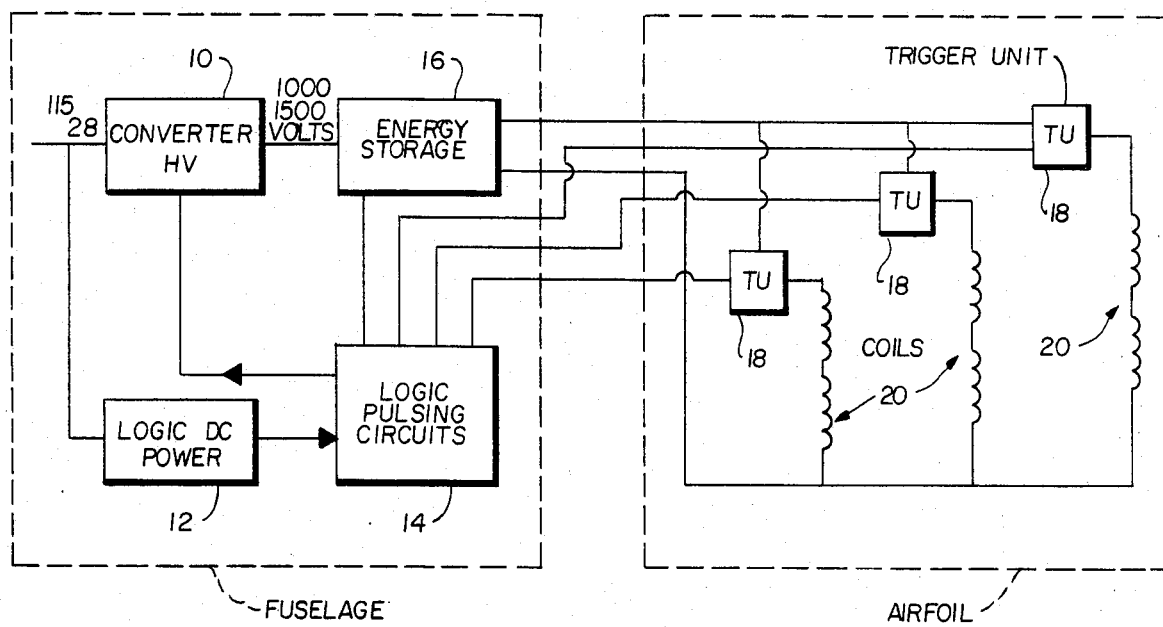
FIG. 1 is a circuit block diamgram illustrating the signal processing employed by the invention.

Referring now to FIG. 1 there is schematically shown in block diagram the electronic system employed by the invention. A power input which can be either 115 v/400 HZ or 28 vDC is shown connected to either a DC power unit 12 or a converter 10, which may have an EMI filter for delivering a high voltage to the energy storage element 16. Logic pulsing circuits 14 together with the energy storage element 16 are shown connected to a parallel connected array of trigger units 18 in the airfoil section of the system, and the trigger units 18 are in turn connected to their respective set of coils 20. The circuitry which is known per se forms no part of the invention other than a means for implementing the method of operation of the individual coil sets 20, of which there are a numerous array under the leading edge of an airfoil to be more fully discussed below.

The logic power 12 provides regulated voltage outputs to the logic control section 14 which consists of conventional comparator circuits for sensing different voltage levels selected by the operator of the system, for example, selected voltage steps between 800 v and 1500 v for thus controlling the voltage in the energy storage element 16 which may consist of 5–80 mfd capacitors connected in parallel. The selection of particular induction coil sets 20 and their associated trigger or pulse release units 18 are controlled by a sequencing logic section in the logic control element 14, and the firing of the SCR triggering units of the pulse release circuits 18 is by timer pulses from three to five seconds apart. The pulse release or triggering units 18 are mounted in the airfoil or wing near their associated coil sets 20, as previously mentioned. Should there be a failure in the logic control section 14, or a failure in the power supply, each trigger unit 18 can be switched manually so as to fire when desired.

Figure 2:
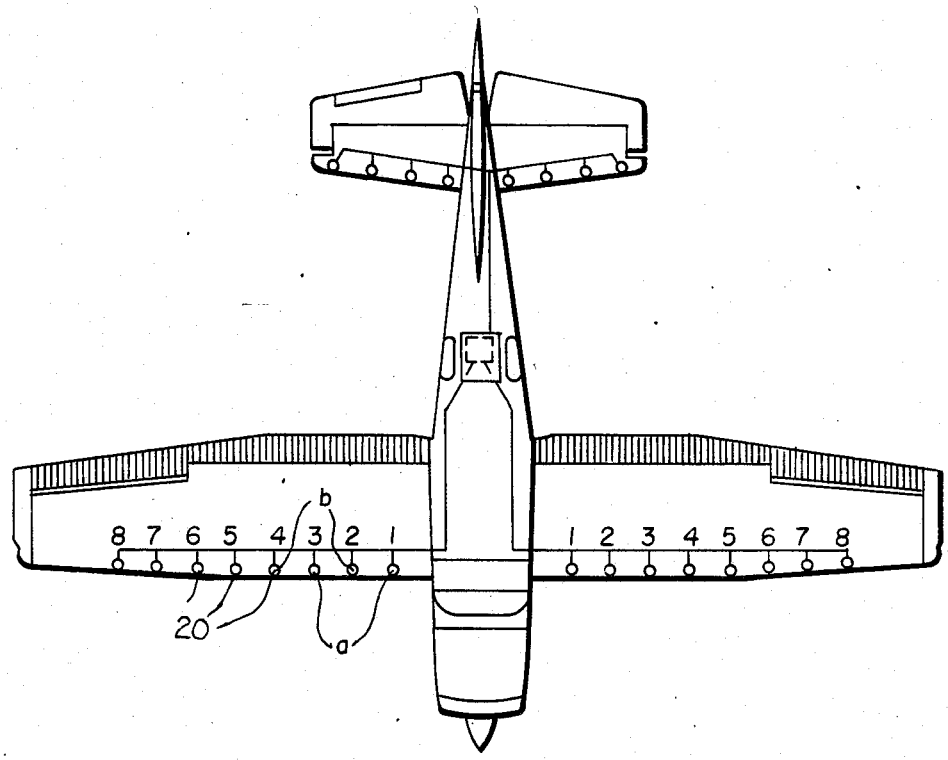
FIG. 2 is a schematic illustration of an aircraft showing the pattern of triggering the coil sets according to the invention.

In FIG. 2 an array of coil sets 20 are shown positioned under the leading edge of an airfoil 22 together with their respective triggering units 18. The coil sets are also marked from 1 to 8 and are divided into interlocking pairs a and b, as shown. In energizing the coils the following pattern is employed: coils 1 and 3 are simultaneously energized, then coils 2 and 4 are simultaneously energized and so on until the total number of coils are energized in accordance with this pattern. Thus, the coil set pairs a and b are sequentially energized until all the pairs are energized. This particular pattern or mode of energizing the coil sets offers the advantage that when a pair of coil sets such as a or b are energized, the intervening coil set between the two coil sets constituting a pair as above defined is also affected by the energy expended on the surrounding coil sets so that the ice is somewhat jarred at that position on the airfoil as well, thus priming it or preparing it as part of the next pair to be energized. To complete the sequence of firing as above described coils 5 and 7 would be fired simultaneously after the firing of coil 2 and 4, and following 5 and 7 would be coil set 6 and 8.

Figure 3:
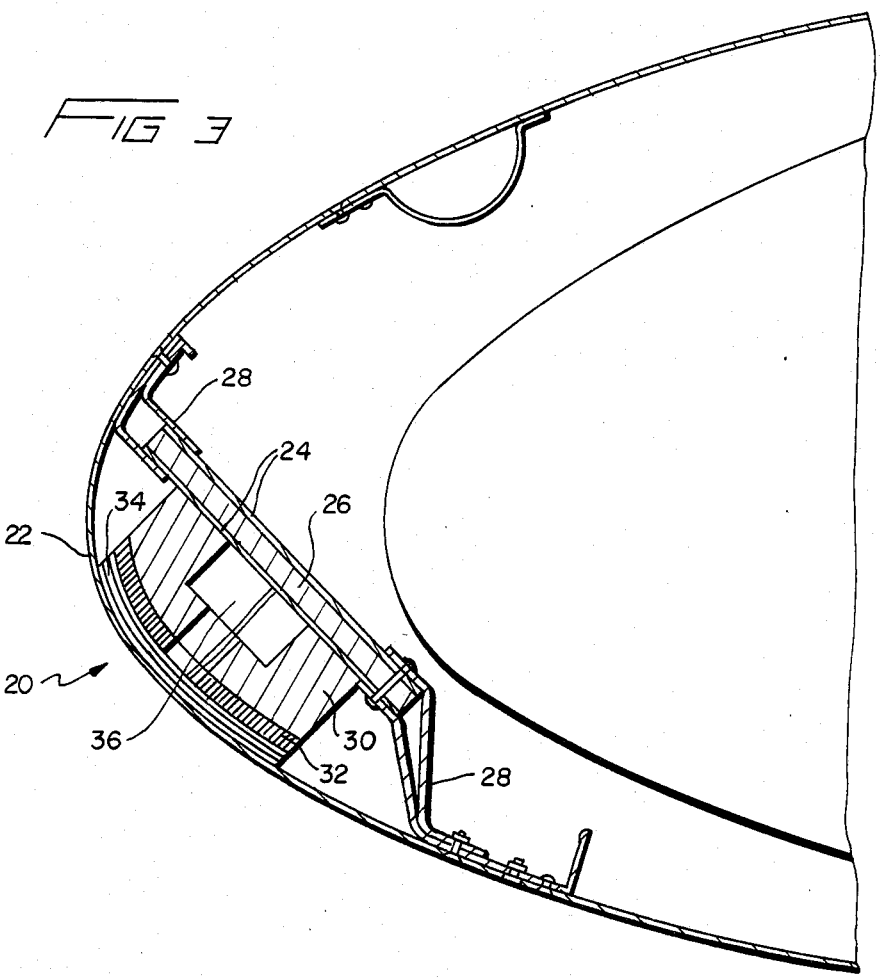
FIG. 3 is a partial cross section view of an induction coil structure used with the invention.

In FIG. 3 is shown a detailed configuration of an induction coil in which the leading edge of an airfoil contour is shown to have riveted generally across the nose portion thereof a parallel plate structure 24 of lightweight insulating material such as fiberglass or the like between which is sandwiched a foam layer material 26, the entire structure being held in place by bracket support 28 which clamp each end of the parallel plate structure 24, as shown. Positioned beneath the structure 24 and extending towards the lowermost portion of the airfoil is a lightweight insulating block material, a phenolic block 30, for example, which presses against the induction coil structure 32 and causes it to conform to the curve of the airfoil. The coil structure 32 comprises a copper ribbon coil so that by means of the slippage between the ribbon elements of the coil structure caused by the pressure exerted by the block 30, the coil conforms its cross sectional shape to the curve of the airfoil and can assume, therefore, an adjustment to whatever curved surface it is applied to.

Between the coil structure 32 and the airfoil skin 22 are preferably two thin doubler sheets of aluminum 34 or similar alloy material. The leads 34 of the coil 32 are seen to exit from the center of the coil through an aperture 36 provided in the block 30. The leads 34 connect with the appropriate triggering unit 18 located in the wing or airfoil section of the aircraft in the general vicinity of the coil set 20 to which it is associated.

Figure 4A:
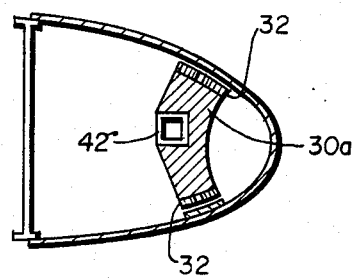
FIGS. 4a–4d illustrate in partial cross section further modifications of the coil arrangement shown in Feg. 3.

In FIGS. 4a–4d there are shown four different embodiments of the coil structure 32, each one showing a different portion of the airfoil being engaged by the coil structure 32 and hence a different curved surface to which it is applied. In FIG. 4a, for example, a support beam 42 extends normal or right angles to the plane of the drawing, and the insulating block 30a is shown supported thereby and extending both to the top of the leading edge 22 and to the bottom thereof. Thus, a pair of coils 32 are supported by the block 30a preferably by means of brackets as shown in FIG. 3 and are sandwiched between the blocks 30a and the airfoil skin, it being understood that a thin metal doubler sheet or two is inserted between the coils 32 and the airfoil skin in the manner described with respect to FIG. 3. In this configuration the coils can be energized simultaneously or alternatively, depending on the logic selected in the logic control circuits 14.

Figure 4C:
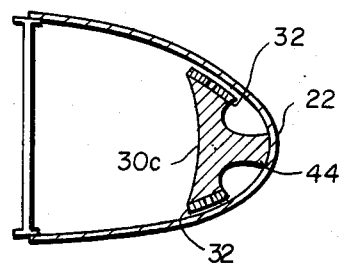
Figure 4B:
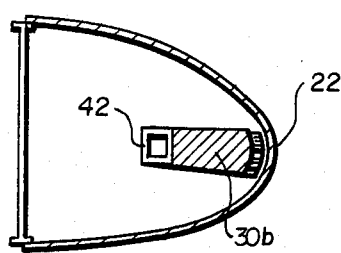

In FIG. 4b a nose coil configuration is shown which is somewhat similar to the FIG. 3 embodiment insofar as a single coil structure 32 is shown. Here, however, the coil is positioned directly in the center of the nose portion of the airfoil where the curvature is more acute than the adjacent portions of the airfoil.

In FIG. 4c a push-pull arrangement is shown in which the coils 32 are positioned as shown in FIG. 4a, but in this case the supporting block 30c extends as well to the nose portion of the airfoil 22 where it is firmly secured to the airfoil by suitable rivets 44. In this way when the coils 32 are simultaneously energized, that is, when they impact or "push" against the surface of the airfoil the nose portion of the airfoil is caused to be "pulled" inwardly towards the interior of the airfoil because of the pulling force exerted by the block 30c.

Figure 4D:
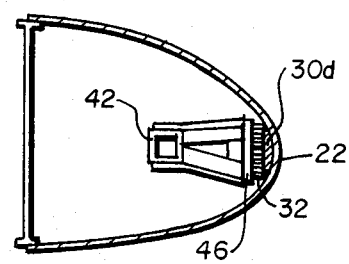

In FIG. 4d an inverse type of coil configuration is shown in which the coil 32 is directly mounted to the nose portion of the airfoil by means of the insulating block 30d which is secured to the inside surface of the airfoil skin by suitable adhesion means and/or rivets, not shown. When energized the coil strikes a metal target plate 46 which is supported on metal supports 48 attached to the central support 42. In this embodiment the coil 32 strikes the metal target plate 46 when energized and causes the nose portion of the airfoil 22 to deform inwardly towards the interior thereof, while at the same time that the coil impacts against the metal target it sets up a vibration throughout the airfoil skin as well thus enhancing the effects of deformation in the skin of the airfoil. In this particular case a composite skin material is preferred, that is, a composition material which will be more suitable to this particular kind of deformation and vibration—for example, a synthetic plastic material combining the qualities of malleability and strength.

Whatever coil configurations are used, whether that shown in FIG. 3 or those shown in FIGS. 4a–4d, the coil sets themselves can be arranged along the airfoil in a linear array under the leading edge portion of the airfoil. It has been found, for example, that for a typical commercial aircraft of medium size, a Boeing 737, for example, 32 coil sets extending along and under the leading edge of each wing are sufficient for the removal of ice formed on the wings up to several inches in thickness. Naturally, other and different sized aircraft would require different numbers of coil sets. In fact it has been found that if the ice is allowed to build up, its removal is easier. For the tail wings and the leading edge of the tail itself 17 and 18 coil sets for each airfoil has been found to be sufficient.

In operating the de-icing system according to the principles of the invention the coil sets are energized sequentially in interlocking pairs beginning from the tip of the wings and progressing towards the fuselage or vice versa, with the coil sets of each pair being fired simultaneously. This particular mode of sequentially and simultaneously firing the coils has been found to be the most effective for implementing the deicing system according to the invention. In firing the coils via the circuit logic 14, it has been found that firing each coil set twice is the most expedient method. For example, the first pulse released by the triggering unit 18 to a coil set 20 causes the ice formed on the wing of the aircraft to fracture, and the second pulse delivered to the same coil set causes the ice to be propelled in small fragments from the aircraft. This second pulse is delivered from 3 to 5 seconds after the first pulse is delivered.

The example given above is, of course, representative and it is to be understood that smaller aircraft would require a lesser number of coil sets, while large aircraft would require a larger number of coil sets.

The foregoing refers to preferred embodiments of the invention, it being understood that other embodiments and variants thereof are possible within the spirit and scope of the invention, the latter being defined by the appended claims.

What is claimed and desired to be secured by letters patents of the United States is:

1. A method for de-icing an airfoil of an aircraft by means of a de-icing system having an energy storage means connected via a triggering means for energizing a plurality of electromagnetic coil sets arranged in a linear array under the leading edge of said airfoil for a given span thereof, comprising the steps of
   sequentially selecting interlocking groups of said coil sets for being energized, each of said groups occupying a portion of said span of said airfoil, whereby said interlocking groups are progressively energized along said span of said airfoil,
   simultaneously energizing said coil sets in each of said groups when sequentially selected, including
   triggering each of said coil sets twice from 3 to 5 seconds apart during said energizing step.

2. A method according to claim 1, wherein said interlocking groups of said coil sets comprise pairs, and one coil set of one pair is disposed between the two coil sets constituting another pair.

3. A method for de-icing an airfoil of an aircraft by means of a de-icing system having an energy storage means connected via a triggering means for energizing a plurality of electromagnetic coil sets arranged in a linear array under the leading edge of said airfoil for a given span thereof, comprising the steps of
   sequentially selecting interlocking groups of said coil sets for being energized, each of said groups occupying a portion of said span of said airfoil, whereby said interlocking groups are progressively energized along said span of said airfoil, and
   simultaneously energizing said coil sets in each of said groups when sequentially selected.

4. A method according to claim 3, wherein said interlocking groups of said coil sets comprise pairs, and one coil set of one pair is disposed between the two coil sets constituting another pair.

5. A de-icing system for an airfoil of an aircraft, comprising
   an energy storage means,
   a triggering means connected to said energy storage means,
   a plurality of electromagnetic coil sets connected to said triggering means and disposed in a linear array under the leading edge of said airfoil for a given span thereof,
   a logic circuit means connected to said triggering means for sequentially selecting interlocking groups of said coil sets to be energized by said energy storage means, each of said groups occupying a portion of said span of said airfoil, whereby said interlocking groups are progressively energized along said span of said airfoil, and
   said triggering means simultaneously energizing said coil sets in each of said sequentially selected interlocking groups.

6. A de-icing system according to claim 5, wherein each of said coil sets comprises a ribbon-like coil winding.

7. A de-icing system according to claim 5, wherein said energy storage means and said logic circuit means are disposed within the fuselage of said aircraft.

* * * * *